US008406428B2

(12) United States Patent
Bauchot et al.

(10) Patent No.: US 8,406,428 B2
(45) Date of Patent: *Mar. 26, 2013

(54) SECURE METHOD AND APPARATUS TO VERIFY PERSONAL IDENTITY OVER A NETWORK

(75) Inventors: Frederic Bauchot, Saint-Laurent-du-Var (FR); Gerard Marmigere, Drap (FR); Carole Truntschka, Saint-Laurent-du-Var (FR); Florence Tressols, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 588 days.

This patent is subject to a terminal disclaimer.

(21) Appl. No.: 12/615,838

(22) Filed: Nov. 10, 2009

(65) Prior Publication Data
US 2010/0150353 A1 Jun. 17, 2010

(30) Foreign Application Priority Data

Dec. 11, 2008 (EP) .................................... 08305916

(51) Int. Cl.
*H04L 29/06* (2006.01)
(52) U.S. Cl. ........ 380/282; 713/168; 713/186; 713/189; 726/15; 726/4; 726/7
(58) Field of Classification Search .................. 382/282; 380/282; 713/168, 186, 189, 176; 726/15, 726/4, 7
See application file for complete search history.

(56) References Cited

U.S. PATENT DOCUMENTS

| 5,280,527 | A | 1/1994 | Gullman et al. |
| 5,764,769 | A | 6/1998 | Bennett et al. |
| 6,002,770 | A * | 12/1999 | Tomko et al. ................... 380/44 |
| 6,202,151 | B1 * | 3/2001 | Musgrave et al. ............ 713/186 |
| 6,219,793 | B1 * | 4/2001 | Li et al. ............................ 726/19 |
| 6,310,966 | B1 * | 10/2001 | Dulude et al. ................ 382/115 |
| 6,535,978 | B1 * | 3/2003 | Padgett et al. ................ 713/156 |
| 6,553,494 | B1 * | 4/2003 | Glass ............................ 713/186 |
| 6,851,051 | B1 | 2/2005 | Bolle et al. |
| 7,278,025 | B2 | 10/2007 | Saito et al. |
| 7,310,734 | B2 | 12/2007 | Boate et al. |
| 7,519,204 | B2 * | 4/2009 | Bjorn et al. ................... 382/124 |
| 7,623,659 | B2 * | 11/2009 | Huang et al. ................... 380/44 |
| 7,979,698 | B2 * | 7/2011 | Wong ............................ 713/161 |
| 8,056,121 | B2 * | 11/2011 | Hamilton et al. ................ 726/4 |
| 2001/0025342 | A1 * | 9/2001 | Uchida ......................... 713/186 |

(Continued)

OTHER PUBLICATIONS

"Internet bot", http://en.wikipedia.org/wiki/Internet_bot, pp. 1-3, last printed Nov. 9, 2009.

(Continued)

*Primary Examiner* — David Garcia Cervetti
(74) *Attorney, Agent, or Firm* — Scully, Scott, Murphy & Presser, P.C.; Jean Sullivan, Esq.

(57) ABSTRACT

The present application provides an apparatus and method for verifying a user, via captured biometric characteristics of the user, who is interacting online. The captured biometrics are guaranteed to be captured in real-time, and avoids the possibility of providing biometrics that were previously captured, by sending to the user a time-sensitive challenge and requiring the user to provide the requested biometric information within a predetermined time period. Therefore, the present invention is best positioned for environments where trusted identification of a user is needed online to facilitate secure transactions.

12 Claims, 4 Drawing Sheets

U.S. PATENT DOCUMENTS

| | | | |
|---|---|---|---|
| 2001/0047479 A1 | 11/2001 | Bromba et al. | |
| 2002/0104027 A1 | 8/2002 | Skerpac | |
| 2002/0176583 A1* | 11/2002 | Buttiker | 380/282 |
| 2003/0101349 A1* | 5/2003 | Wang | 713/186 |
| 2003/0163710 A1 | 8/2003 | Ortiz et al. | |
| 2004/0059924 A1* | 3/2004 | Soto et al. | 713/186 |
| 2004/0148509 A1* | 7/2004 | Wu | 713/186 |
| 2004/0162981 A1* | 8/2004 | Wong | 713/161 |
| 2004/0172535 A1 | 9/2004 | Jakobsson et al. | |
| 2007/0050303 A1* | 3/2007 | Schroeder et al. | 705/67 |
| 2007/0106895 A1* | 5/2007 | Huang et al. | 713/170 |
| 2007/0237368 A1* | 10/2007 | Bjorn et al. | 382/124 |
| 2007/0277040 A1* | 11/2007 | Scheidt et al. | 713/176 |
| 2008/0098214 A1* | 4/2008 | Rodriguez Martinez et al. | 713/156 |
| 2009/0013191 A1* | 1/2009 | Popowski | 713/186 |
| 2009/0031140 A1* | 1/2009 | Abdallah et al. | 713/186 |
| 2009/0037745 A1* | 2/2009 | Abdallah et al. | 713/186 |
| 2009/0037746 A1* | 2/2009 | Abdallah et al. | 713/186 |
| 2009/0052745 A2* | 2/2009 | Sathath | 382/115 |
| 2009/0113524 A1* | 4/2009 | Hamilton et al. | 726/4 |
| 2010/0119061 A1* | 5/2010 | Kawale | 380/44 |
| 2011/0093158 A1* | 4/2011 | Theisen et al. | 701/30 |
| 2011/0107225 A1* | 5/2011 | Sukanen et al. | 715/736 |
| 2011/0107431 A1* | 5/2011 | Sukanen | 726/27 |
| 2011/0113241 A1* | 5/2011 | Umezawa et al. | 713/156 |
| 2011/0119637 A1* | 5/2011 | Tuli et al. | 715/863 |

OTHER PUBLICATIONS

Boneh, "Twenty Years of Attacks on the RSA Cryptoystem", Notices of teh American Mathematical Society, 46(2); pp. 203-213, Feb. 1999.

Kuhn et al., "Introduction to Public Key Technology and the Federal PKI Infrastructure", NIST publication SP 800-32, Feb. 26, 2001.

IEEE Standard for Information Technology—Telecommunications and information exchange between systems—Local and metropolitan area networks—Specific requirements, Part 11: Wireless LAN Medium Access Control (MAC) and Physical Layer (PHY) Specifications, IEEE Std 802.11 (2007).

* cited by examiner

SECURE METHOD AND APPARATUS TO VERIFY PERSONAL IDENTITY OVER A NETWORK

CROSS-REFERENCE TO RELATED APPLICATIONS

The present application is related to a co-pending U.S. patent application Ser. No. 12/559,067 filed on Sep. 14, 2009, which is incorporated herein by reference.

FIELD OF THE INVENTION

The present invention generally relates to a system and method for securely identifying a person over a network; and specifically for identifying a person via biometric device that insures the captured biometric characteristics are captured in real-time and were not previously generated.

BACKGROUND OF THE INVENTION

Historically, sensitive transactions, e.g. transactions conducted with government agencies or private financial institutions, have been conducted in person to, in part, verify the person with whom the transaction was being conducted. For example, a picture identification from a trusted source (such as a driver's license) could be compared with the person opening a new account with a private financial institution, such as a local branch of a bank. Recently, however, the trend is to conduct business at arms-length, i.e., to migrate transactions between parties towards becoming more impersonal and to accommodate remote interactions. For example, local and national banks, as well as government agencies, are enabling persons to perform a number of sensitive transactions over computer networks, such as public computer networks (e.g., the "Internet"). Since these communications often occur over public computer networks, the communications are typically encrypted, and hence provide some measure of security. Although the communication channels are secure, however, identification of the parties is difficult to verify during these arms-length transactions, and hence run the risk of fraud or other abuses of trust. Moreover, a countertrend to conducting transactions over the Internet via a webpage or similar technologies, i.e. impersonal transactions, attempts to make the interactions more personal by allowing the transactions to occur within a virtual world (also known as the "3D Internet").

A virtual world is a computer-based simulated environment where avatars (i.e., a virtual representation of a user) inhabit and interact with other avatars. In a virtual world (e.g., Active Worlds™), a human projects himself/herself into the virtual world in the form of an actor (e.g., a motional avatar) that can interact within the virtual world. Examples of virtual worlds include, but are not limited to, Second Life®, There, Eve Online and others such as Metaverse (e.g., a virtual world where humans interact with each other and software applications in three dimensional space that uses a metaphor of a real world) and MMORPGs (Massively Multiplayer Online Role-Playing Games) environments.

These virtual world environments often include imaginary characters participating in fictional events, activities and transactions. There are educational and entertainment benefits in creating new and challenging ways to relate virtual world environments with real-world experiences.

Currently, however, virtual world communities are expanding beyond education and entertainment. For example, some virtual world communities, typified by Second Life, are attracting attention and increasing in popularity—in part, by allowing various transactions to occur with real-world implications within the virtual world. In virtual world communities, however, the owner of an avatar is not easily discernable and hence, verifiable. For example, in the virtual world, a "real owner" (i.e. a human) can be represented by more than one "virtual characters" (i.e. avatars) with x, y, z coordinates that are mapped within the three-dimensional space deemed to be the virtual world.

Moreover, virtual worlds have a number of characteristics that facilitate monitoring and rating activities within the virtual world. One such characteristic is that there are always some users (perhaps residing in different time zones) participating, and hence logged onto, the virtual world. Consequently, there is a persistent presence of users and users can interact relatively easily with other users at any time. In the existing communities of users, tags or rating values may be assigned to the users (or more specifically, to the users' avatars), based on a user's interaction with others. In addition, it is easy for users to move (or "teleport") between communities, simply by modifying the three-dimensional coordinates of an avatar. However, a group of users who do malicious actions can intentionally increase their rating values. Accordingly, such ratings cannot be trusted as a criterion of indicating correct evaluations or a person's credentials.

In addition, many users belong to a plurality of groups. In many of the existing implemented communities, admittance into a building or an island is controlled on a group-by-group basis (e.g., membership to a discount club that has a presence in the virtual world). Accordingly, users who do malicious actions often belong to a certain group (there is also a possibility that malicious actors frequently change the name of their group as a countermeasure, for example). An administrator of a community can easily find out what group a user belongs to, but cannot easily verify whether the user of the avatar is the same user who is registered with a group. Hence, regulating admittance into a building or an island based on group affiliation is difficult to administrate effectively.

Another situation unique to virtual worlds that raises a security concern is ascertaining whether a human is controlling the avatar. To wit, "Internet bots", also known as web robots, WWW robots, or simply bots, are software applications that run automated tasks over the Internet (see, e.g., "http://en.wikipedia.org/wiki/Internet_bot"); consequently, bots are able to control an avatar instead of a human controlling the avatar. Typically, bots perform tasks that are both simple and structurally repetitive, and while performance of these tasks is relatively harmless, bots are not limited these types of actions.

For example, programs and algorithms can be used to create bots that mimic actions of avatars within virtual environments. Thus, bots could be a particular issue within Virtual Store Environments, creating a three-dimensional version of email spamming and junk mail. For example, as more retailers enter the realm of Second Life, bots could be used as a viral marketing technique as avatars are created for no reason other than to promote products, hassle customers, etc. In addition, bots could impersonate a user (i.e. a form of identity theft) and conduct a transaction, thereby committing the true owner of the avatar to a transaction not otherwise intended.

Consequently, determining "who" is conducting a transaction online is difficult; e.g., determining whether a human is controlling the avatar and whether the human controlling the avatar is the correct owner (i.e., trusted) and accurately described him or herself. Due to this inherent difficulty online, malicious users can easily steal another user's identity, or within a virtual world, change the status of an avatar (perhaps used by another user) within the virtual world. This type of malicious use, which is a consequence of the inherent difficulty associated with verifying the identity of a person, can become troublesome during business transactions, can lead to defamation and may raise privacy concerns.

Therefore, it would be highly desirable to provide an apparatus and method for human identification for use in a virtual world environment as well as other online environments, that identifies a human user in real-time, and prevents the user from using previously used credentials as a way of gaining unauthorized access or performing unauthorized transactions.

SUMMARY OF THE INVENTION

The present invention relates to an apparatus and method for establishing a user's identity. More particularly, the present invention is best positioned for environments where trusted identification of a user is needed online, for example, within a virtual world, to facilitate secure transactions. Consequently, the existence of the user, e.g., an avatar within a virtual world, may be defined by a unique identifier, such as a name and surname, and the present application seeks to enforce this uniqueness.

Therefore, in light of the above, one object of the present invention is an apparatus and method to obtain verified biological characteristics data, e.g., biometrics, of a person.

Another object of the present invention is to guaranty that the biological pattern has been contemporaneously captured.

Still another object of the present invention is to enable users to electronically sign the biological pattern using a challenge with limited time life.

Yet another object of this invention is to encrypt the challenge with the RSA public key of the user.

Another object of this invention is to store the RSA private key in a protected memory belonging to a biometric capturing apparatus.

Therefore, one aspect of the present invention provides a self-contained apparatus for on-demand authentication of a user over a network of computing devices, where a first computing device connected to the network of computing devices issues a temporary challenge to the user for authentication, comprising:

means for capturing biometric information of the user in response to a received temporary challenge from the first computing device, whose validity is limited in time;

means for encrypting the biometric information with the received challenge as an encrypted response;

means for returning the encrypted challenge to the first computing device; and means for authenticating the user by processing the encrypted challenge within a limited amount of time.

Another aspect of the present invention provides A method for on-demand authentication of a user, comprising:

receiving a challenge issued by a first computing device connected to a network of computing devices, at a user device via a network connection;

capturing, at the user device, biometric information of the user in response to a received challenge, whose validity is limited in time, from a trusted third party;

encrypting the biometric information with the received challenge as an encrypted response;

returning the encrypted challenge to the first computing; and means for authenticating the user by processing the encrypted challenge within a limited amount of time.

Further benefits and advantages of the invention will become apparent from a consideration of the following detailed description, given with reference to the accompanying drawing, which specifies and shows preferred embodiments of the invention.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed descriptions of illustrative embodiments, when read in conjunction with the accompanying drawings. In each of the drawings below, as well as the respective descriptions, the same numbers are used throughout to reference like components and/or features.

DETAILED DESCRIPTION OF THE INVENTION

Figure 1:
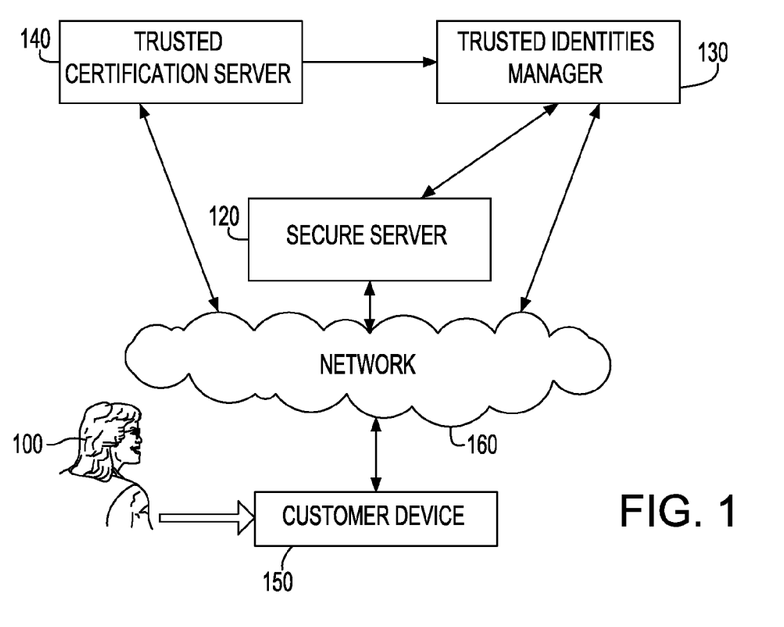
FIG. 1 shows the components of a system in accordance with an embodiment of the present invention.

The present invention provides an apparatus and method for verifying a user, via captured biometric characteristics of the user, who is interacting online, e.g., within a virtual world environment. FIG. 1 shows specific components of a system in accordance with one embodiment of the present invention. In the embodiment shown, Trusted Certification Server 140 authenticates certificates that may be presented by users to verify their identities. As illustrated in FIG. 1, Trusted Certification Server 140 communicates with Secure Server 120 via Trusted Identities Mgr 130. Secure Server 120 is the logical entity that a user communicates with to conduct a secure transaction and may constitute a processing device, such as a server, or a plurality of processing devices operating as a single logical entity, such as server cluster.

According to the present application, Trusted Identities Mgr 130 is an entity enabled to set, request and verify a user's identity. While not specifically shown in FIG. 1, Trusted Identities Mgr 130 is, for example, a server-class computer that is able to securely communication with Secure Server 120. Secure communications include, but are not limited to, robustly encrypted direct connections, logical connections that are robustly encrypted (e.g. Virtual Private Network protocols). In addition, Trusted Identities Mgr 130 may be a logical entity (e.g. a software application) that is executed concurrently with Secure Server 120. In such instances, however, Secure Server 120 still requires a secure communications mechanism, albeit a logical one, to communicate with Trusted Identities Mgr 130. Examples of secure communications between separate logical entities running concurrently include, but are not limited to, secure socket connections (SSL) between such entities and Secure Inter-Process Communications (SIPC) protocols.

Also illustrated in FIG. 1 is User 100, who is a physical person, operating Customer device 150. As shown in FIG. 1, User 100 is interacting with Customer device 150, as Customer device 150 communicates with Secure Server 120, via through a network connection via network 160, to perform a transaction. Network 160 includes all forms of network technologies and is not limited in any way; for example network 160 may include a public network of computers, the Internet, an intranet, Local Area Network, Wide Area Network, wireless networks, etc. Thus, for example, Secure Server 120 may allow User 100 to conduct certain operations while communicating with Secure Server 120; e.g., open new account with the bank, or obtain a passport from a government agency.

Figure 2:
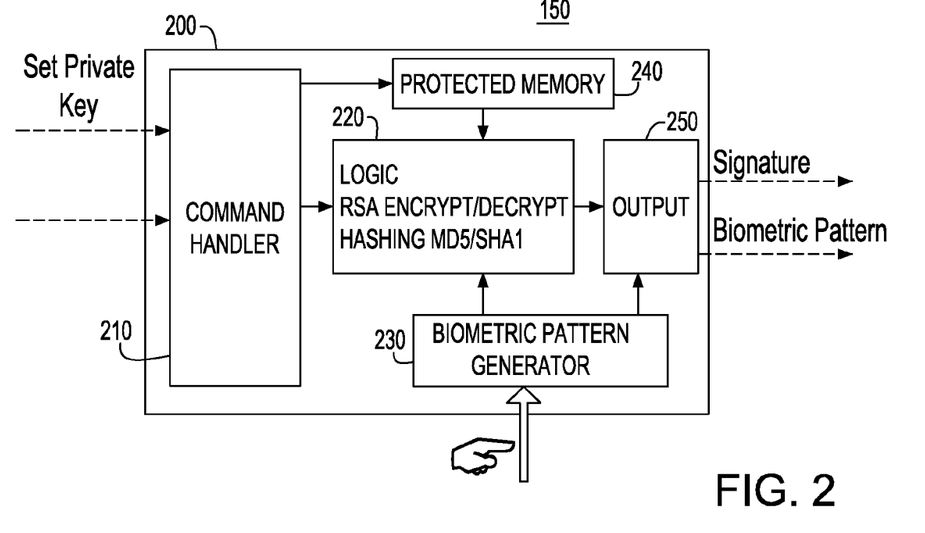
FIG. 2 shows further detail of an apparatus according to one embodiment of the present invention

FIG. 2 illustrates one embodiment of a Customer device 150, shown in FIG. 1, e.g., a self-contained apparatus (hereinafter, a "Biometric Collector Apparatus") that is used for capturing and transmitting biological characteristics (i.e., biological "patterns" or "parameters") of User 100 in real-time. As illustrated, Customer device 150 includes Biometric Collector Apparatus 200 comprising several basic functional components: Biometric Pattern Generator 230, Protected Memory 240, Command Handler 210, Secure Logic Unit 220 and Output 250.

Biometric Pattern Generator 230 is programmed to capture high resolution biological characteristics of the user. For example, Biometric Pattern Generator 230 can be adapted to scan, or otherwise capture, human characteristics, such as the iris or retina part of the eye, the user's voice, a handprint, fingerprints and the user's hand-written signatures. Once Biometric Pattern Generator 230 captures the biological characteristics of the user, Biometric Pattern Generator 230 transforms what has been captured into a digital form; for example, a biological pattern.

Protected Memory 240 is a secure persistent memory that is not readable outside the Biometric Collector Apparatus 200. For example, as shown in FIG. 2, Protected Memory 240 only receives input from Command Handler 210. As described below, one operation performed by the Command Handler 210 when communicating with Protected Memory 240 is to save the personal encryption information of the user. In addition, Protected Memory 240 cannot be read from an external interface; however, may be accessed by Secure Logic Unit 220. Thus, Protected Memory 240 is used to store the user's personal encryption information; for example a private key. In the preferred embodiment, this key is a RSA private key and is associated with the user's certificate, according to common Public Key Infrastructure frameworks.

Uses of user certificates within a Public Key Infrastructure (or "PKI") are well developed in the relevant art, as described, for example, in "Introduction to Public Key Technology and the Federal PKI Infrastructure" (NIST publication SP 800-32, Feb. 26, 2001). Thus, referring back to FIG. 1 for example, User 100 possesses a user certificate issued by Trusted Server 140. The user certificate owned by User 100 includes the public key issued by Trusted Server 140 uniquely to User 100, and the certificate may be distributed to others. In addition, a private key is separately issued to User 100 by Trusted Server 140 and User 100 is the only entity in possession of this unique private key. Accordingly, User 100 can encrypt a message with the private key and send the message to a recipient in possession of the user certificate and the recipient of that message can verify the authenticity of the message by using the public key stored in the user certificate of User 100 to decrypt the message (see generally NIST publication SP 800-32, Feb. 26, 2001). The use of public keys according to the invention includes, for example, the RSA public key encryption algorithm as described in, for example, Boneh, Dan, "Twenty Years of attacks on the RSA Cryptosystem", *Notices of the American Mathematical Society* 46(2): pp. 203-213 (1999) and incorporated herein by reference.

In addition, referring back to FIG. 2, Command Handler 210 executes commands that control the operation of Biometric Collector Apparatus 200. For example, in one embodiment, Command Handler 210 may execute the following commands: SetKey and RequestIdentity. In the preferred embodiment, the SetKey command stores the private key of User 100 in Protected Memory 240, and is the only operation within Biometric Collector Apparatus 200 allowed to write information to Protected Memory 240. To further secure the SetKey command, an alternative embodiment may require User 100 to supply the correct password before allowing execution of the SetKey command. In addition, the RequestIdentity command, according to one exemplary embodiment, causes the following actions to be performed: (1) decrypt a challenge sent by Secure Server 120, (2) enable Biometric Pattern Generator 230 to read the user's biological characteristics (or biometric pattern), (3) calculate and encrypt a user's digital signature (which may include, for example, the user's biometric pattern, a temporary challenge, and a hash thereof, as described below), (4) expose through Output 250 the biometric pattern and the signature. Each of these actions will be discussed in further detail below.

As illustrated in FIG. 2, Secure Logic Unit 220 is couple to Command Handler 210, Biometric Pattern Generator 230, Protected Memory 240 and Output 250. In a preferred embodiment, Secure Logic Unit 220 is an Application Specific Integrated Circuit (or ASIC) encoded to perform both public key encryption and hashing Thus, in one embodiment of the present invention, the biometric pattern is encrypted to prevent unauthorized access to the pattern and hashed to prevent unauthorized manipulation of the biometric pattern. As illustrated in FIG. 2, the encryption is performed according to the RSA encryption algorithm and the hashing is performed according to the MD5 or SHA-1 algorithms; however, those skilled in the art would recognize that other encryption/hashing algorithms are possible and the present invention is by no means meant to be limited to those illustrated in FIG. 2. Alternatively, Secure Logic Unit 220 may be a general purpose processor, which has been adapted to perform the necessary operations needed to hash the inputs and encrypt the results. In addition, Secure Logic Unit 220 is coupled to Output 250, which (though not illustrated in FIG. 2) communicates the biometric pattern and signature (discussed in further detail below) to Secure Server 120.

As configured in FIG. 2, Biometric Collector Apparatus 200 is highly secure. For example, the use of Protected Memory 240 insures that the private key of User 100 remains secure and prevents any user from reading the private key. Thus, the private key of User 100 is stored uniquely in a protected memory only accessible by Biometric Collector Apparatus 200. Moreover, it is not possible to replace the biometric pattern with a previously intercepted pattern, because of the security offered by hashing and encrypting the biometric pattern within Biometric Collector Apparatus 200. As will be discussed in further detail below, in one embodiment, biometric pattern is signed using a challenge delivered by Trusted Identities Mgr 130 and the private key of User 100. This operation is denoted, using common cryptographic nomenclature, as "RSAencrypt(Hash(pattern||challenge), $K_{pr}$)". In other words, a hash of the captured biological pattern and the received temporary challenge are encrypted using, for example, the RSA encryption algorithm and the private key of User 100. Additionally, the temporary challenge issued by Trusted Identities Mgr 130 has a very limited time life, e.g. a few minutes or an reasonable amount of time to allow transmission of the temporary challenge, capture of the user's biometric pattern and return of the hash/encrypted response. The temporary challenge is issued specifically for User 100 and only readable by User 100, because the challenge is encrypted with the public key of User 100, as obtained via the certificate of User 100. Since the challenge, and the corresponding response, are both time limited, a malicious user would find intercepting and decrypting the challenge to be extremely difficult.

Figure 3:
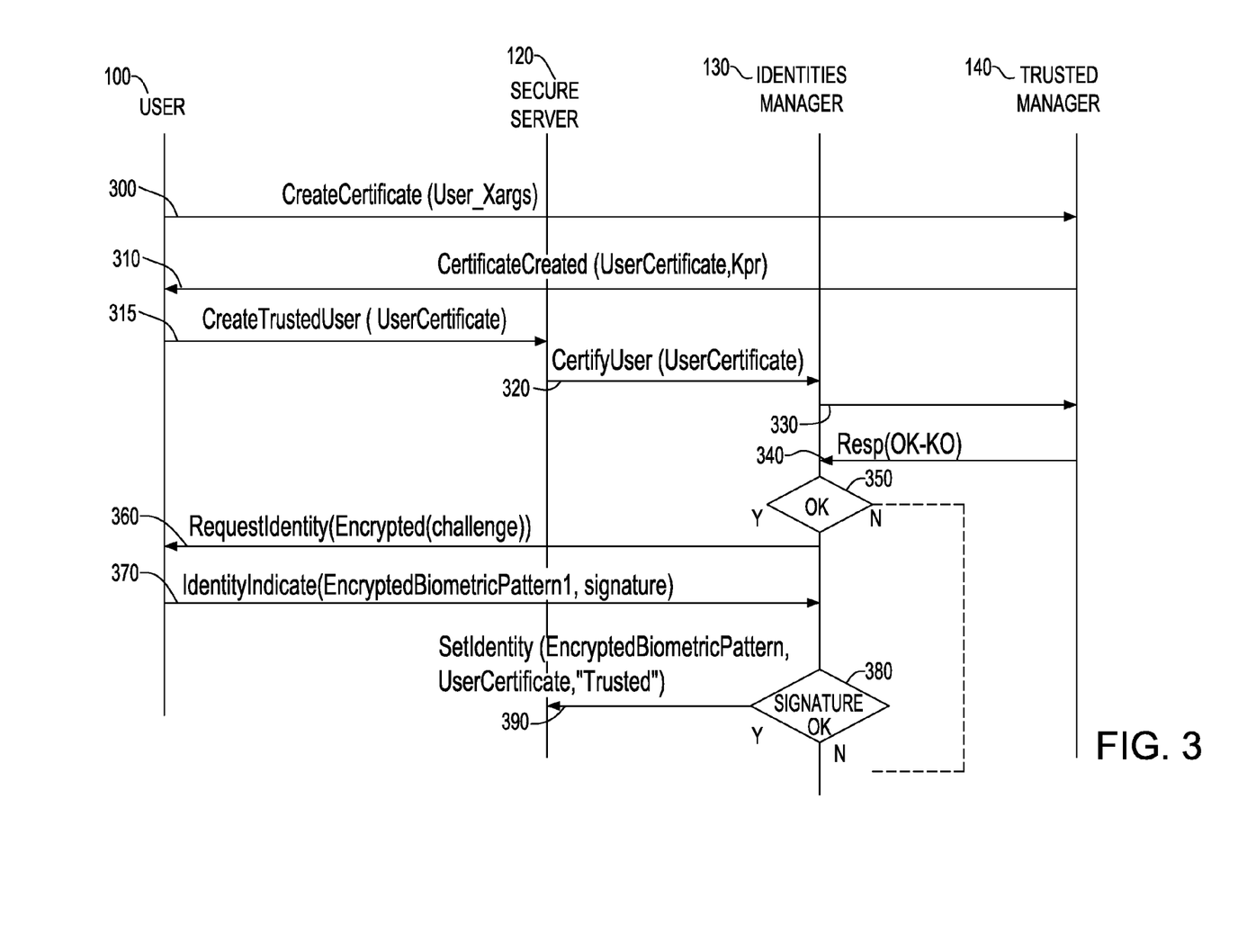
FIG. 3 shows a sequence diagram illustrating the procedure, embodying this invention, between the different components of an embodiment of the present invention during avatar creation.

FIG. 3 describes in detail, with reference to components illustrated in FIG. 1, one embodiment of the present invention used to create a new account; for example, a new avatar on a virtual world server according to the method and system described in U.S. patent application Ser. No. 12/559,067 filed on Sep. 14, 2009, filed concurrent herewith. In step 300, User 100 communicates a request to Trusted Server 140 to create a user certificate. In addition to the message shown at step 300, additional messages between Trusted Server 140 and User 100 may be required that are not shown in FIG. 3, but these additional messages are well known in the art and will not be discussed further. As a result of communicating a request, and providing all the requested information to Trusted Server 140, in step 310, User 100 is issued a user certificate, which contains a public key and sent electronically to User 100, and a private key, sent electronically to User 100 separate from the user certificate.

In step 315, User 100 requests a new account with Secure Server 120, (i.e., creation of a new avatar) and requests the account to be trusted, by transmitting the user certificate to Secure Server 120. At step 320, Secure Server 120 communicates a request to Trusted Identities Mgr 130 to verify the identity of User 100 and transmits the user certificate received from User 100. Next, in steps 330 and 340, Trusted Identities Mgr 130 communicates a request to Trusted Certification server 140 to check the validity of the certificate sent by User 100 during step 300. If Trusted Certification Server 140 determines that the certificate presented by User 100 is not valid, as shown in step 350, the creation process ends.

If Trusted Certification Server 140 determines that the certificate is valid in step 350, Trusted Identities Mgr 140 calculates a temporary challenge and encrypts it with the public key retrieved from the user certificate and communicates the encrypted temporary challenge to User 100 in step 360 to validate the identity of User 100.

In step 370, Biometric collector apparatus 200 captures the biometric pattern of User 100 and transmits the biometric pattern and a signature to Trusted Identities Mgr 130. In one embodiment, the signature transmitted to Trusted Identities Mgr 130 includes, for example, a hashing of the biometric pattern concatenated with the received challenge. Hashing in one embodiment of the present invention includes the MD5 or SHA1 algorithms. The resulting hash is encrypted with the user's private key and the result of the encryption constitutes the signature transmitted to Trusted Identities Mgr 130.

In step 380, Trusted Identities Mgr 130 checks the validity of the signature, as received by User 100. If the signature is acceptable via any means available to verify signatures (see e.g., NIST publication SP 800-32, Feb. 26, 2001), the biometric pattern of User 100, preferably captured via a secure device, is bound to the newly created account (e.g. an avatar created within a virtual world) and stored in a secure location.

The sequence of steps 360 and 370 may be repeated several times to get several patterns. For example, the security requirements of a particular embodiment of the present invention may require several different patterns (e.g., fingerprints, palm print, iris and retinal scan) to be verified to trust a user.

In another embodiment, several patterns may be required if the first pattern transmitted from User 100 is an insufficient quality and requires a new pattern of a superior quality before the process of FIG. 3 will proceed. In yet another embodiment of the present invention, the sequence of steps 360 and 370 may be retried if the signature is defective. In such an embodiment, the security status of User 100 will remain "Untrusted" if after a predetermined number of retries the expected number of patterns has not been collected and the process illustrated in FIG. 3 will terminate.

Figure 4:
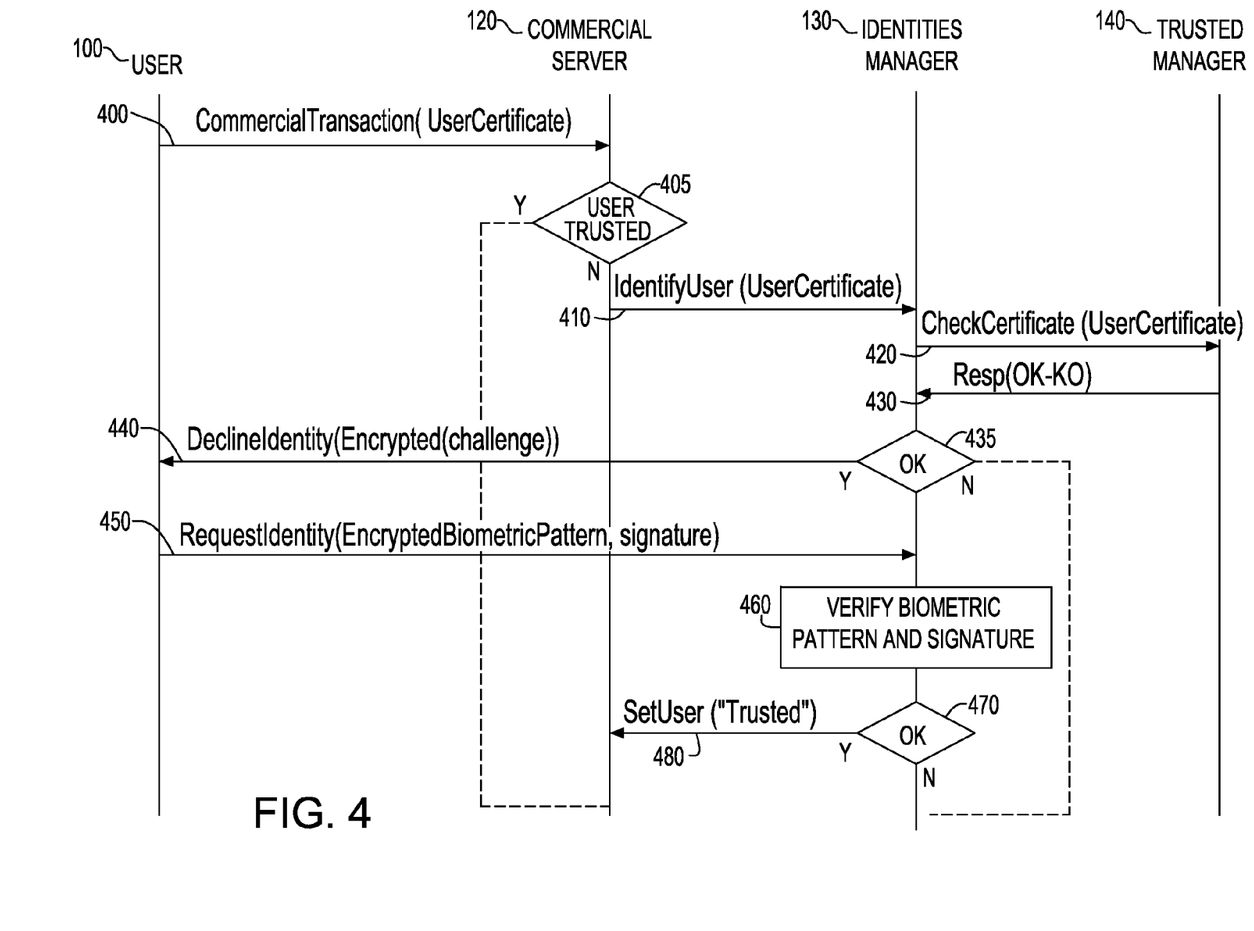
FIG. 4 shows a sequence diagram illustrating a procedure, embodying this invention, between the different components of an embodiment of the present invention when setting the security status of an avatar.

FIG. 4 illustrates an exemplary procedure, according to one embodiment of the present invention and with reference to the components illustrated in the exemplary embodiment of FIG. 1, for setting the security status of an account associated with User 100; for example, the status of an existing avatar associated with User 100. In step 400, Secure Server 120 requires verification of User 100 identity—e.g., whether an avatar of User 100 is trustworthy—and requests the user certificate of User 100. Consequently, in step 410, Secure Server 120 communicates a request to Trusted Identities Mgr 130 to verify the identity of User 100, and includes the user certificate in the request to Trusted Identities Mgr 130.

In step 420 and 430, Trusted Identities Mgr 130 transmits a request to Trusted Server 140 to verify the user certificate received from User 100 and receives a response. If Trusted Server 140 is unable to verify the user certificate, the process ends. However, if Trusted Server 140 is able to verify the user certificate provided by User 100, Trusted Identities Mgr 130 calculates a temporary challenge and encrypts the temporary challenge with the public key of the User 100 extracted from the user certificate.

Next, in step 440, Trusted Identities Mg 130 communicates a request to User 100 to verify his or her identity by sending a response that includes the encrypted temporary challenge. At step 450, Biometric Collector Apparatus 200 captures the biometric pattern of User 100 n (e.g., fingerprint, retinal scan, etc.) and transmits the biometric pattern and a signature to Trusted Identities Mg 130. In one embodiment, the signature transmitted to Trusted Identities Mgr 130 includes, for example, a hashing of the biometric pattern concatenated with the received challenge. Hashing according to the present invention may include the MD5 or SHA1 algorithms. The resulting hashing is encrypted with the private key of User 100 and the result of the encryption constitutes the signature transmitted to Trusted Identities Mgr 130.

Trusted Identities Mgr 130 verifies the biometric parameters returned from User 100 (captured as a biometric pattern), in step 460, against the prior stored biometric patterns retrieved from the previously created account (e.g., an avatar associated with User 100). In addition, Trusted Identities Mgr 130 verifies the validity of the signature received from User 100. If, after Trusted Identities Mgr 130 tests the signature and biometric pattern in step 460, and both the signature and biometric pattern are acceptable, then security status of User 100 is set to "Trusted" in step 480. Otherwise the process illustrated in FIG. 4 terminates and the security status remains "Untrusted" for User 100.

Figure 5:
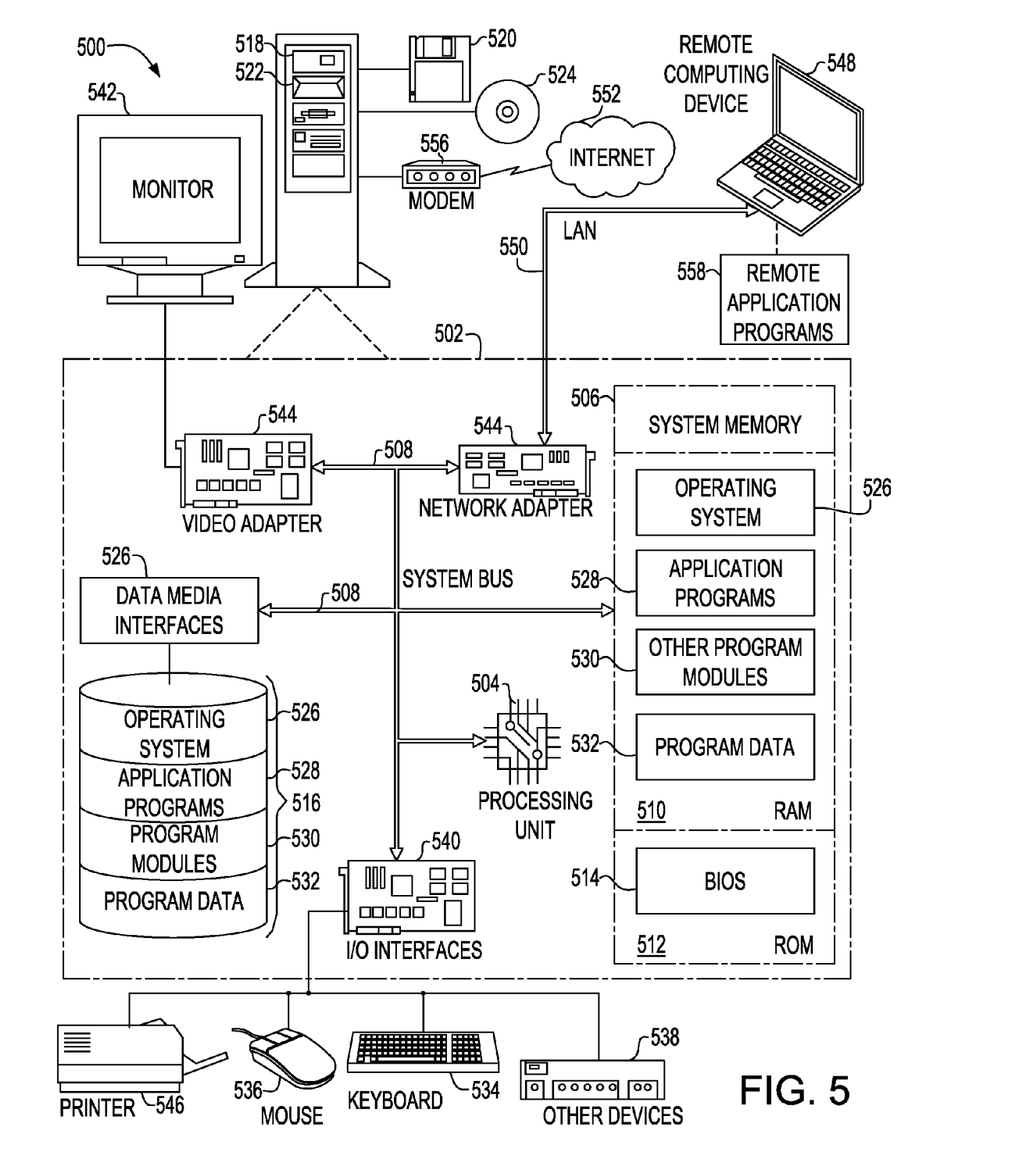
FIG. 5 depicts a general computing environment that, as an example, may be used to practice this invention.

FIG. 5 illustrates a general computer environment 500 that can be used to implement the virtual world avatar verification techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Both the LAN and WAN form logical connections via wired communication mediums and appropriate communication protocols (such as Ethernet, see e.g., IEEE 802.3-1998 Std) or wireless communication mediums and appropriate communications protocols (such as Wi-Fi; see e.g., IEEE 802.11-2007 Std). Such networking environments are commonplace in homes, offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication links) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc.

that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A system for on-demand authentication of a user as an owner of an avatar interacting in a virtual world environment, said system comprising:
   means for issuing, from a first computing device, a temporary challenge to the user interacting in said virtual world environment at a second computing device, said temporary challenge issued with limited time life for authenticating the user, and said temporary challenge being encrypted with a public key of said user, said public key employed as part of a public key encryption algorithm;
   means for receiving, at said second computing device, said temporary challenge with limited time life, said second computing device having a memory storage device including a protected memory storing a private key of the user;
   means for decrypting said received temporary challenge with said private key;
   means for capturing biometric information of the user in response to the received temporary challenge from the first computing device;
   means for hashing the biometric information at said second computing device;
   means for encrypting the hash of the captured biometric information concatenated with the received challenge as an encrypted response, said encrypting means employing said stored private user key of the user;
   means for returning the encrypted response to the first computing device; and
   means for authenticating the user at said first computing device by processing the encrypted challenge within a limited amount of time.

2. The system according to claim 1, wherein the public key encryption algorithm includes RSA algorithm.

3. The system according to claim 1, wherein the hashing is according to at least one of an MD5 hash algorithm and an SHA-1 hash algorithm.

4. The system according to claim 1, wherein the received challenge was transmitted by a virtual world server.

5. The system according to claim 1, wherein the biometric information includes digitally captured human characteristics of at least one of a fingerprint, a handprint, a hand-written signature, an iris and a retina.

6. The system according to claim 1, wherein said limited time life is on the order of minutes, or an amount of time to allow transmission of the temporary challenge, capture of the user's biometric pattern and return of the hash/encrypted response by the user.

7. A method for on-demand authentication of a user as an owner of an avatar interacting in a virtual world environment, said method comprising:
   issuing, from a first computing device, a temporary challenge to the user interacting in said virtual world environment at a second computing device, said temporary challenge issued with limited time life for authenticating the user, and said temporary challenge being encrypted with a public key of said user, said public key employed as part of a public key encryption algorithm;
   receiving, at said second computing device, said temporary challenge with limited time life, said second computing device having a memory storage device including a protected memory storing a private key of the user;
   decrypting said received temporary challenge with said private key;
   capturing, at the user device, biometric information of the user in response to the received temporary challenge;

hashing the biometric information at said second computing device;

encrypting, using said stored private user key of the user, the hash of the captured biometric information concatenated with the received temporary challenge as an encrypted response;

returning the encrypted response to the first computing device; and authenticating the user at said first computing device by processing the encrypted challenge within a limited amount of time.

8. The method according to claim 7, wherein the public key encryption algorithm includes RSA algorithm.

9. The method according to claim 7, wherein the hashing is according to at least one of an MD5 hash algorithm and an SHA-1 hash algorithm.

10. The method according to claim 7, wherein the first computing device is a virtual world server.

11. The method according to claim 7, wherein the biometric information includes digitally captured human characteristics of at least one of a fingerprint, a handprint, a handwritten signature and an iris.

12. The method according to claim 7, wherein said limited time life is on the order of minutes, or an amount of time sufficient to allow transmission of the temporary challenge, capture of the user's biometric pattern and return of the hash/encrypted response by the user.

* * * * *